(12) United States Patent
Xu et al.

(10) Patent No.: US 11,479,359 B2
(45) Date of Patent: Oct. 25, 2022

(54) UAV OPERATION ROUTE PLANNING METHOD, UAV PESTICIDE SPREADING METHOD AND DEVICE

(71) Applicant: BOE TECHNOLOGY GROUP CO., LTD., Beijing (CN)

(72) Inventors: Bo Xu, Beijing (CN); Tong Liu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 260 days.

(21) Appl. No.: 16/404,180

(22) Filed: May 6, 2019

(65) Prior Publication Data
US 2020/0023973 A1    Jan. 23, 2020

(30) Foreign Application Priority Data

Jul. 23, 2018   (CN) .......................... 201810813650.6

(51) Int. Cl.
    *B64D 1/18*     (2006.01)
    *B64C 39/02*    (2006.01)
    (Continued)

(52) U.S. Cl.
    CPC .............. *B64D 1/18* (2013.01); *B64C 39/024* (2013.01); *G05D 1/0094* (2013.01); *G05D 1/101* (2013.01); *B64C 2201/12* (2013.01)

(58) Field of Classification Search
    CPC ..... B64D 1/18; B64C 39/024; B64C 2201/12; G05D 1/0094; G05D 1/101
    See application file for complete search history.

(56) References Cited

U.S. PATENT DOCUMENTS

| 9,618,934 B2 | 4/2017 | Deroos et al. |
| 9,678,507 B1 * | 6/2017 | Douglas ............... G08G 5/0069 |

(Continued)

FOREIGN PATENT DOCUMENTS

| CN | 103699135 A | 4/2014 |
| CN | 104503464 A | 4/2015 |

(Continued)

OTHER PUBLICATIONS

First Office Action dated Nov. 19, 2020 for corresponding Chinese application 201810813650.6.

*Primary Examiner* — Behrang Badii
*Assistant Examiner* — Jay Khandpur
(74) *Attorney, Agent, or Firm* — Nath, Goldberg & Meyer; Joshua B. Goldberg (57) ABSTRACT

The present disclosure provides a UAV operation route planning method, a UAV pesticide spreading planning method and device for providing improvements on the operation accuracy of UAV. The UAV operation route method comprises steps of: obtaining a plurality of sub-areas of an operation area of a UAV; exhausting operation orders of the sub-areas and waypoint sequences in each of the sub-areas, respectively; planning routes according to the operation orders of the sub-areas and the waypoint sequences in each of the sub-areas to obtain all routes in the operation area; and determining a route in all the routes having a total voyage meeting a preset constraint condition as an optimal operation route.

14 Claims, 5 Drawing Sheets

(51) Int. Cl.
*G05D 1/00* (2006.01)
*G05D 1/10* (2006.01)

(56) References Cited

U.S. PATENT DOCUMENTS

2017/0308081 A1\* 10/2017 Bash .................... G08G 5/0082
2020/0257003 A1\* 8/2020 Zhu ...................... G08G 5/0013

FOREIGN PATENT DOCUMENTS

| CN | 105116913 A | | 12/2015 | |
|----|---|---|---|---|
| CN | 106020237 A | | 10/2016 | |
| CN | 107037827 A | | 8/2017 | |
| CN | 107291101 A | \* | 10/2017 | ........... B64C 39/024 |
| CN | 107748499 A | | 3/2018 | |
| CN | 107911793 A | \* | 4/2018 | ............ D05B 19/08 |
| CN | 108674681 A | \* | 10/2018 | |
| CN | 108805885 A | \* | 11/2018 | |
| CN | 109090076 A | \* | 12/2018 | |
| CN | 110262563 A | \* | 9/2019 | ............ G05D 1/104 |
| DE | 4033325 A1 | \* | 4/1991 | ............ D05B 19/08 |
| WO | WO-2018057314 A2 | \* | 3/2018 | ........... B64C 39/024 |
| WO | WO-2018136875 A1 | \* | 7/2018 | ........... G06K 9/6221 |

\* cited by examiner

UAV OPERATION ROUTE PLANNING METHOD, UAV PESTICIDE SPREADING METHOD AND DEVICE

CROSS-REFERENCE TO RELATED APPLICATIONS

The present application claims priority to Chinese Patent Application No. 201810813650.6, entitled "UAV (Unmanned Aerial Vehicle) Operation Route Planning Method, UAV Pesticide Spreading Method and Device", filed to the Chinese Intellectual Property Office on Jul. 23, 2018, the disclosure of which is incorporated herein by reference.

FIELD OF THE INVENTION

The present disclosure relates to, but is not limited to, the field of UAV (Unmanned Aerial Vehicle) flight controls, and in particular, to a UAV operation route planning method, a UAV pesticide spreading method and device.

BACKGROUND

With the wide use of UAV technology in various fields, researches on UAV route planning are particularly necessary.

Currently, UAV control is mainly focused on manual visual control or remote control. The visual control is to control the UAV's flight by manually manipulating a remote controller by a driver to plan the route in real time based on the driver's vision. The remote control is to control the UAV's flight remotely by the driver to plan the route in real time with reference to the positioning of the UAV. It can be seen that both of the visual control and the remote control are greatly affected by human factors. Driving fatigue and visual error can cause the UAV route deviation, which affects the accuracy of UAV operation.

SUMMARY

In view of the above problems, an objective of embodiments of the present disclosure is to provide a UAV operation route planning method, a UAV pesticide spreading method and a device, for providing the improvement on operation accuracy of UAV by calculating a globally optimal UAV route.

In order to address the technical problems as set forth above, in the first aspect, there is provided a UAV operation route planning method according to an embodiment of the present disclosure, including steps of: obtaining a plurality of sub-areas of an operation area of a UAV; exhausting operation orders of the sub-areas and waypoint sequences in each of the sub-areas, respectively; planning routes according to the operation orders of the sub-areas and the waypoint sequences in each of the sub-areas to obtain all routes in the operation area; and determining a route in all the routes having a total voyage meeting a preset constraint condition as an optimal operation route.

According to an embodiment of the present disclosure, the step of planning routes according to the operation orders of the sub-areas and the waypoint sequences in each of the sub-areas to obtain all routes in the operation area, includes: sorting the waypoint sequences in each of sub-areas according to the operation orders of the sub-areas to obtain a set of waypoint sequences of the operation area; and planning the routes according to the waypoint sequences in the set of the waypoint sequences of the operation area to generate all the routes of the operation area.

According to an embodiment of the present disclosure, the step of sorting the waypoint sequences in each of sub-areas according to the operation orders of the sub-areas to obtain a set of waypoint sequences of the operation area, includes: pairing each of the operation orders in the sub-areas with each of the waypoint sequences in the sub-areas; and sorting each of the waypoint sequences according to the operation order paired with the waypoint sequence to obtain the set of waypoint sequences of the operation area.

According to an embodiment of the present disclosure, the step of sorting the waypoint sequences in each of sub-areas according to the operation orders of the sub-areas to obtain a set of waypoint sequences of the operation area, includes: determining a starting waypoint of each of sub-areas according to the waypoint sequence in each of sub-areas; marking a status for each of sub-areas according to the starting waypoint to obtain a status identifier of each of sub-areas; sorting the status identifiers of the sub-areas according to the operation orders of the sub-areas, to obtain a status identification sequence of the operation area; and associating the operation order of each of the sub-areas with the status identification sequence to constitute the set of waypoint sequences of the operation area.

According to an embodiment of the present disclosure, the step of marking a status for each of sub-areas according to the starting waypoint includes: for each of the sub-areas, in the case where the starting waypoint in the sub-area is the first waypoint in the sub-area, marking the status of the sub-area as a first value; and in the case where the starting waypoint in the sub-area is the second waypoint in the sub-area, marking the status of the sub-area as a second value.

According to an embodiment of the present disclosure, the step of obtaining a plurality of sub-areas of an operation area of the UAV includes: determining the operation area according to an electronic map, and extracting coordinates of vertices of the operation area fitting the operation area to a polygonal area according to the coordinates of the vertices; and dividing the polygonal area into the plurality of sub-areas, wherein the sub-areas are a convex-polygonal area.

According to an embodiment of the present disclosure, the step of dividing the polygonal area into the plurality of sub-areas includes: converting sequential sides of the polygonal area into edge vectors by using an arbitrary vertex of the polygonal area as a starting point; calculating an outer product of each adjacent edge vectors; and extending one of the two adjacent edge vectors having a negative value of the outer product to divide the polygonal area into the plurality of sub-areas.

According to an embodiment of the present disclosure, the step of determining a route in all the routes having a total voyage meeting a preset constraint condition as an optimal operation route includes: determining a route in all the routes having the shortest voyage as the optimal operation route.

In the second aspect, there is provided a UAV pesticide spreading method according to an embodiment of the present disclosure, including: driving a UAV to perform an operation of spreading pesticides in accordance with the optimal operation route according to one or more technical solutions as set forth above.

According to an embodiment of the present disclosure, the method further includes receiving the optimal operation route sent from a ground station by the UAV.

In the third aspect, there is provided a UAV operation route planning device according to an embodiment of the present disclosure, including: an area dividing unit configured to divide an operation area of a UAV into a plurality of sub-areas; an exhaustive unit configured to exhaust operation orders of the sub-areas and waypoint sequences in each of the sub-areas, respectively; a route planning unit configured to plan the routes according to the operation orders of the sub-areas and the waypoint sequences in each of the sub-areas to obtain all routes in the operation area; and a route determining unit configured to determine a route in all the routes having a total voyage meeting a preset constraint condition as an optimal operation route.

According to an embodiment of the present disclosure, the route planning unit includes: a sorting sub-unit configured to sort the waypoint sequences in each of sub-areas according to the operation orders of the sub-areas to obtain a set of waypoint sequences of the operation area; and a planning sub-unit configured to plan the routes according to the waypoint sequences in the set of the waypoint sequences of the operation area to generate all routes of the operation area.

In the fourth aspect, there is provided a UAV pesticide spreading device according to an embodiment of the present disclosure, including: a controller configured to control a UAV to operate in accordance with the optimal operation route according to one or more technical solutions as set forth above; and a pesticide spreader configured to perform an operation of spreading pesticides during flight of the UAV.

In the fifth aspect, there is provided a computing device according to an embodiment of the present disclosure, including: at least one processor; and at least one memory and a bus in connection with the processor, wherein the processor and the memory communicate with each other via the bus; the processor is configured to invoke program instructions in the memory to perform the steps of the UAV route planning method according to one or more technical solutions as set forth above.

In the sixth aspect, there is provided a UAV according to an embodiment of the present disclosure, including: at least one processor; and at least one memory and a bus in connection with the processor, wherein the processor and the memory communicate with each other via the bus; the processor is configured to invoke program instructions in the memory to perform the steps of the UAV operation route planning method according to one or more technical solutions as set forth above and/or to perform the steps of the UAV pesticide spreading method according to one or more technical solutions as set forth above.

In the UAV operation route planning method and the UAV pesticide spreading method and device according to the embodiments of the present disclosure, after obtaining the plurality of sub-areas of the operation area of the UAV, operation orders of the sub-areas and waypoint sequences in each of the sub-areas are exhausted, respectively. In this way, according to the operation orders of the sub-areas and the waypoint sequences in the sub-area, all the routes of the operation area can be obtained, and then the route having the total voyage meeting the preset constraint condition is selected as the optimal operation routes from all the routes. At this point, the optimal route is the global optimal solution. If the UAV is operating according to the optimal operation route, the operation accuracy of the UAV can be effectively improved.

BRIEF DESCRIPTION OF THE DRAWINGS

In order to more clearly illustrate the embodiments of the present disclosure or the technical solutions in the related art, accompanying drawings to be used in the embodiments or the description of the related art will be briefly described below. Obviously, the drawings in the following description are some embodiments of the present disclosure, and further drawings can be obtained by those skilled in the art without paying creative labor.

DETAILED DESCRIPTION OF THE EMBODIMENTS

The technical solutions in the embodiments of the present disclosure will be clearly and completely described below in conjunction with the accompanying drawings. It is apparent that the described embodiments are some but not all of the embodiments of the present disclosure. Other embodiments may be derived from these embodiments without paying creative labor.

In an embodiment of the present disclosure, there is provided a UAV operation route planning method, which can be used to plan a heading of a UAV. A concave-polygonal operation area is divided into a plurality of convex-polygonal sub-areas by using a region decomposition method. For the sake of simple calculation, each sub-area is assumed to be a mass point, and a preferred sub-area operation order can be obtained through traversal planning of points. In this operation order, operation starting waypoints and ending waypoints of sub-areas are binary coded and the local optimal operation route can be obtained by genetic algorithm, thus realizing the planning of the UAV operation route. However, in this way, the preferred sub-area operation order is first obtained, which here is actually an estimate. Then, a relatively optimal operation route in a global route, which is not equivalent to a global optimal operation route, may be obtained by the route planning in the operation order. Therefore, if the UAV operates according to the relatively optimal route in the global route, an impact on the accuracy of the UAV operation still exists.

Figure 1:
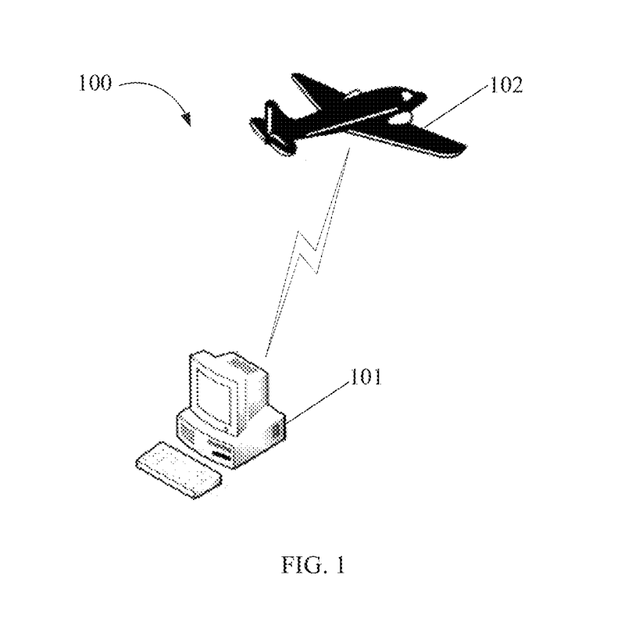
FIG. 1 is a schematic diagram of a UAV system according to an embodiment of the present disclosure.

In order to address the above problem, in an embodiment of the present disclosure, there is further provided a UAV operation route planning method, which can be applied to an autonomous operating UAV system. FIG. 1 is a schematic diagram of a UAV system according to an embodiment of the present disclosure. Referring to FIG. 1, the UAV system 100 can include at least: a UAV ground station 101 and a UAV 102. Here, the UAV ground station may be a desktop computer, a tablet computer, a smart phone, or the like, which is not specifically limited in the embodiment of the present disclosure.

Figure 2:
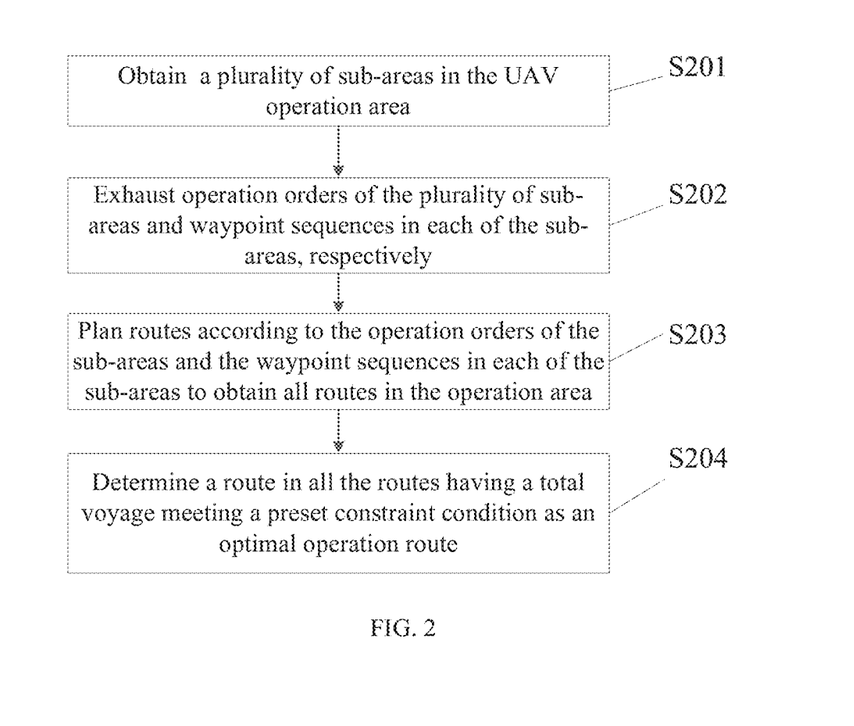
FIG. 2 is a flowchart of a UAV operation route planning method according to an embodiment of the present disclosure.

FIG. 2 is a schematic flow chart of a UAV operation route planning method according to an embodiment of the present disclosure. Referring to FIG. 2, the method may include:

S201: obtaining a plurality of sub-areas of an operation area of a UAV;

Here, the UAV ground station or the UAV may determine the operation area of the UAV according to a predetermined plan, and then obtain the plurality of sub-areas of the operation area. The sub-areas of the operation areas may be divided in real time or may be pre-divided, which is not specifically limited in the embodiment of the present disclosure.

Figure 3:
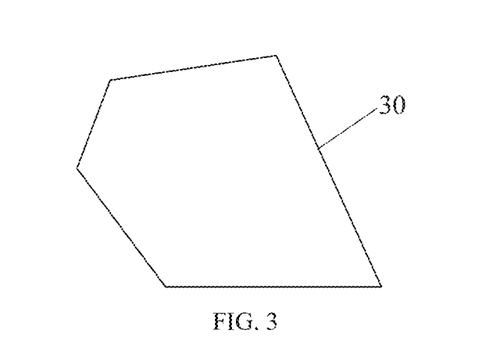
FIG. 3 is a schematic diagram of a UAV operating area according to an embodiment of the present disclosure.
Figure 4:
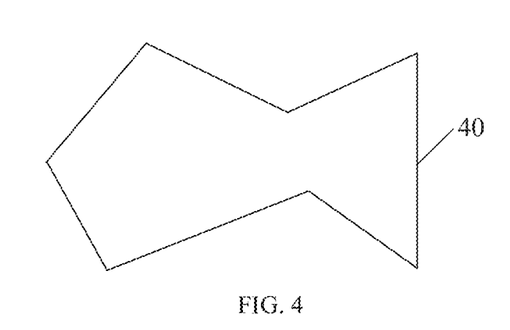
FIG. 4 is a schematic diagram of a UAV operating area according to an embodiment of the present disclosure.

In a practical application, the operation area of the UAV may be a convex-polygonal area 30 as shown in FIG. 3, or may be a concave-polygonal area 40 as shown in FIG. 4. When the operation area is a convex-polygonal, it could be divided into a plurality of sub-areas, such as a plurality of convex-polygonal sub-areas with a small area, thereby reducing the probability of missing during the operation of the UAV; and when the operation area is a concave-polygonal area, it is necessary to divide the concave-polygonal area into a plurality of convex-polygonal sub-areas, thereby reducing the probability of repeated coverage of the UAV.

In a practical application, the operation area may be determined by extracting coordinates of each vertex of the operation area in the geodetic coordinate system, such as the latitude and longitude of each vertex, and then the operation area is divided into sub-areas. Alternatively, a customized coordinate system can be established and the operation area can be mapped to the customized coordinate system for the sub-area division. Of course, there may be other situations, which are not specifically limited in the embodiments of the present disclosure.

S202: exhausting operation orders of the plurality of sub-areas and waypoint sequences in each of the sub-areas, respectively;

Here, the above operation order of the sub-area refers to an order of operations between the sub-areas, i.e., an order of operations of the UAV in each of the sub-areas. For example, the operation area is divided into three sub-areas, which are labeled as sub-area a, sub-area b and sub-area c, respectively. Then, the UAV can operate in the sub-area a first, then in the sub-area b and finally in sub-area c in an operation order of a→b→c; or, the UAV can operate in sub-area a first, then in sub-area c, and finally in sub-area b in an operation order of a→c→b. Of course, other operation orders of the sub-areas are possible. For the three sub-areas, the number of operation orders of the sub-areas that is exhausted should be 3! (the factorial of 3), i.e., 6. For N sub-areas, the number of operation orders for the sub-areas that are exhausted should be N!

Further, the above waypoint sequence in the sub-area refers to an order obtained by sorting the waypoints in each of the sub-areas. The waypoint mentioned herein can be a starting point, an ending waypoint or a combination of the starting waypoint and the ending waypoint in the sub-area. The starting waypoint is used to indicate a waypoint in a sub-area from which the UAV enters the sub-area. The ending waypoint is used to indicate a waypoint in a sub-area from which the UAV leaves the sub-area. For example, taking three sub-areas as an example, assuming two waypoints are included in the sub-area a, that is, point A and point A', in the sub-area a, the UAV may fly into the sub-area a from the point A and fly out of the sub-area a from the point A', or may fly into the sub-area a from the point A' and fly out of the sub-area a from the point A. At this time, the waypoint sequence of the sub-area a may be AA' or A'A. Similarly, the UAV may fly into the sub-area b from point B and fly out of the sub-area b from point B', or may fly into sub-area b from point B' and fly out of sub-area b from point B. At this time, the waypoint sequence of the sub-area b may be BB' or B'B. The UAV may fly into the sub-area c from point C and fly out of sub-area c from point C', or may fly into the sub-area c from point C' and fly out of sub-area c from point C. At this time, the waypoint sequence of the sub-area c may be CC' or C'C. In this embodiment of the present disclosure, since each sub-area includes only two waypoints, there are two waypoint sequences in each sub-area.

Figure 5:
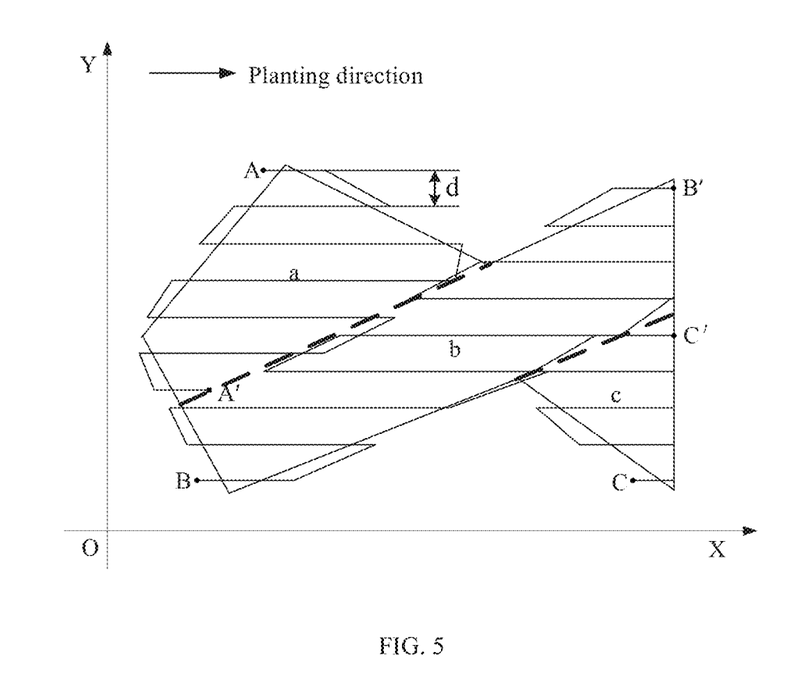
FIG. 5 is a schematic diagram of a waypoint within a sub-area of a UAV operating area according to an embodiment of the present disclosure.

It should be noted that the waypoints in each sub-area can be determined according to the actual operation content of the UAV. For example, the UAV performs an operation of spreading pesticide to crops. In this case, as shown in FIG. 5, the UAV or the UAV ground station can set a spread width d of a pesticide spread UAV according to a planting distance of the crops. In each of the sub-areas, the UAV can be moved in parallel along a planting direction of the crops at an interval of the spread width d. The UAV ground station or UAV may determine a starting point and turning point of spraying for the UAV on each of parallel lines according to a principle of repeated cattle farming (boustrophedon) to complete the spread route planning of the sub-area to obtain the ending point of the spread route in the sub-area, that is, waypoints A and A', B and B', C and C' in the sub-area. Taking the sub-area a as an example, the UAV can start the pesticide spread along the planned route from the waypoint A and end the operation at waypoint A'; or the UAV can also proceed along the planned route from the waypoint A' and end the operation at the waypoint A. Therefore, waypoints A and A' are the pesticide spread starting or ending points of sub-area a.

S203: planning routes according to the operation orders of the sub-areas and the waypoint sequences in each of the sub-areas to obtain all routes in the operation area;

Here, following the step of determining the operation order of the sub-areas and the waypoint sequence in the sub-area at S202, the waypoint sequence in a certain sub-area may be sorted according to the operation order of the sub-area to obtain the waypoint sequence in the whole operation area. For example, in the operation order a→c→b, there may be $2^3=8$ waypoint sequences of the operation area, namely AA'CC'BB', AA'CC'B'B, AA'C'CBB', AA'C'CB'B, A'ACC'BB', A'ACC'B'B, A'AC'CBB', A'AC'CB'B. Then, in all the operation orders, there can be 48 (i.e., $3!\times 2^3=48$) waypoint sequences in the whole operation area. In this way, after obtaining the waypoint sequences in the whole operation area, the route can be planned according to the waypoint sequences to obtain all the routes in the operation area.

In other embodiments of the present disclosure, the waypoint sequence in the whole operation area can also be exhausted by means of a full bipartite graph. In this case, a set of operation orders of the sub-areas and a set of waypoint sequences in the sub-areas may be established according to the operation orders in the sub-areas and the waypoint sequences in the sub-areas, respectively. Then, elements in the two sets are paired in the complete bipartite graph to obtain combinations of {operation orders of sub-areas, waypoint sequences of sub-areas}, for example. Each of combinations can correspond to a waypoint sequence of the whole operation area under the operation order of a certain sub-area. After all the combinations are obtained, the waypoint sequences of the whole operation area can be exhausted, and the route can be planned according to the waypoint sequences to obtain all the routes in the operation area.

In a practical application, the operation routes within each of sub-areas can be planned by the principle of repeated cattle farming (boustrophedon).

S204: determining a route in all the routes having a total voyage meeting a preset constraint condition as an optimal operation route.

Figure 6:
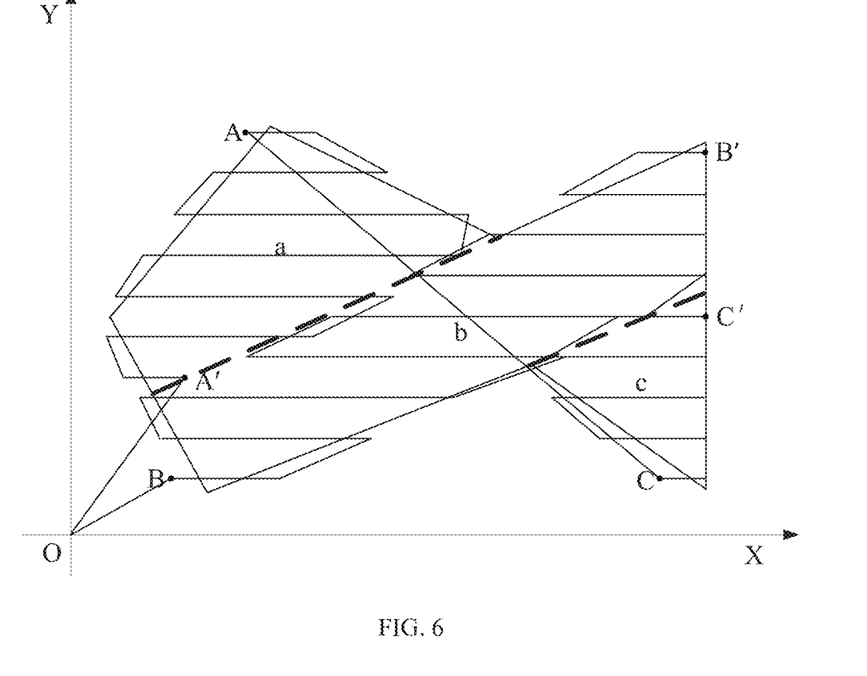
FIG. 6 is a schematic diagram of an optimal planning route according to an embodiment of the present disclosure.

Here, after the waypoint sequences of the whole operation area are exhausted, the UAV ground station or the UAV can determine the route having a total voyage meeting the constraint condition from the waypoint sequences according to the preset constraint condition, which is the global optimal operation route of the whole operation area. For example, the planned route having the optimal voyage as shown in FIG. 6 may be obtained by comparison. At this point, the UAV flies into the sub-area a from a starting point O, starting the operation from the starting waypoint A' until the departure from the ending waypoint A to the starting waypoint C of the sub-area c; then starting the operation from the starting waypoint C; after the completion of the operation in the sub-area c, flying out of the ending waypoint C' to the starting waypoint B' of the sub-area b; then starting the operation from the starting waypoint B' until the completion of the operation in the sub-area b, and then flying out of the ending waypoint C' to the starting point O. In this way, the operations of all sub-area are completed.

In this embodiment of the present disclosure, in order to effectively improve the accuracy of the operation of the UAV while reducing redundant voyage during the operation of the UAV to reduce the energy consumption during the operation of the UAV, the preset constraint condition can be the shortest total voyage. Accordingly, the UAV ground station or the UAV can select a route with the shortest total voyage from all the routes as the optimal operation route. Of course, in order to achieve further purposes, other constraint conditions may be arranged, which are not specifically limited in the embodiments of the present disclosure.

Based on the embodiments as set forth above, in practical applications, since the operation area is the convex-polygonal area on which the route planning is performed as a single area, if the operation area with a concave-polygonal shape is directly used as a single area for route planning, there will be more redundant voyages. Therefore, in order to effectively improve the accuracy of the operation of the UAV and reduce the redundant voyage during the operation of the UAV, when the operation area is a concave-polygonal area, the above step S201 may include: determining the operation area according to an electronic map, and extracting coordinates of vertices of the operation area; fitting the operation area to a polygonal area according to the coordinates of the vertices; and dividing the polygonal area into the plurality of sub-areas, wherein the sub-areas are a convex-polygonal area.

Here, the UAV ground station or the UAV may first read the pre-stored electronic map including the current UAV operation area, and then determine the operation area on the electronic map. At this time, the operation area is located in the geodetic coordinate system from which the coordinates of the vertices of the operation area, such as the latitude and longitude of each vertex, are extracted. Then, the UAV ground station or the UAV can fit the operation area to the polygonal area according to the coordinates of the vertices and then divide the polygonal area into the sub-areas.

Figure 7:
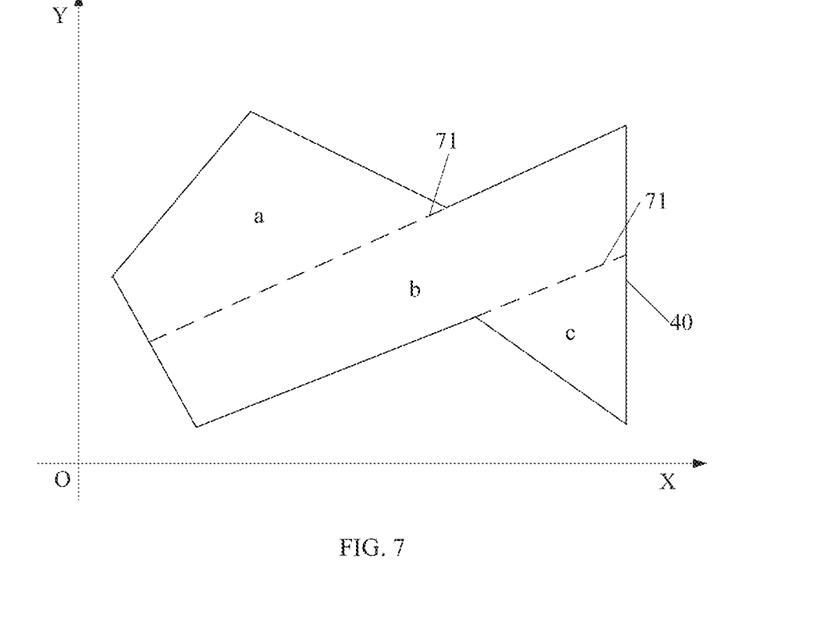
FIG. 7 is a schematic diagram of a sub-area in a UAV operation area according to an embodiment of the present disclosure.

In a specific implementation process, after obtaining the fitted polygonal area, the UAV ground station or the UAV may sequentially convert sides of the polygonal area into edge vectors by using an arbitrary vertex of the polygonal area as a starting point. For example, each side of the polygon is converted into an edge vector in a clockwise direction, or each side of the polygon is converted into an edge vector in a counterclockwise direction. After that, the UAV ground station or the UAV calculates an outer product of each adjacent edge vectors, that is, a difference multiplication of adjacent edge vectors. If the outer product of all adjacent edges has both positive and negative numbers, it can be proved that the polygon has a concave angle, that is, the polygon is a concave polygon. Then, one of the two adjacent edge vectors having a negative value of outer product is extended, as shown by broken lines 71 in FIG. 7, and the concave-polygonal area 40 is divided into three convex-polygonal sub-areas, i.e., the sub-area a, sub-area b and sub-area c.

Figure 8:
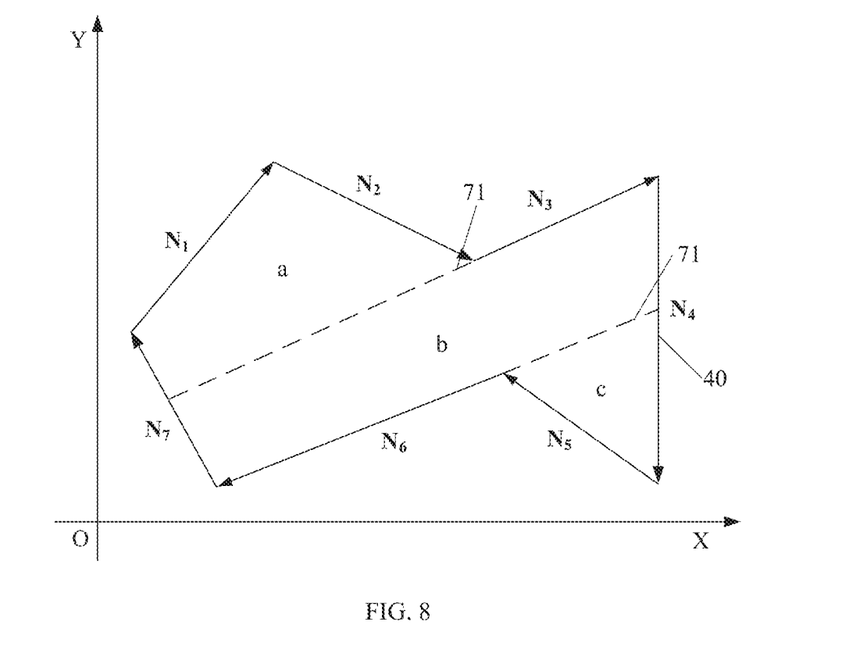
FIG. 8 is a schematic diagram of a UAV operating area in a work environment coordinate system according to an embodiment of the present disclosure.

In other embodiments of the present disclosure, a customized coordinate system, such as an operation environment coordinate system, may also be established, in which the sub-areas are divided. For example, the operation area is first determined in the electronic map; the latitude and longitude coordinates of the vertices of the operation area are extracted to fit to a polygonal area 40 as shown in FIG. 4; an operation environment coordinate system is established with the flight starting point of the UAV as the origin O, the due east direction as a X-axis and the due north direction as Y-axis; the polygonal area is mapped to the operation environment coordinate system, as shown in FIG. 8; the sides of the polygon are converted into edge vectors $N_1, N_2, N_3, \ldots, N_7$ from a certain vertex of the polygonal area as a starting point in the clockwise direction; the outer product $N_i \times N_j$ of adjacent vectors $N_i$ and $N_j$ is calculated, where $i=1, 2, 3, \ldots, 7$, $j=1, 2, 3, \ldots, 7$, $i \neq j$; the first side $N_i$ having a negative value of the outer product is extended; the concave-polygonal area is divided to obtain a plurality of convex-polygonal sub-areas. Operation routes within the sub-area can be planned using the principle of repeated cattle farming (boustrophedon). Of course, the operation environment coordinate system may be established in other manners, which is not specifically limited in the embodiment of the present disclosure.

Based on the embodiments as set forth above, in a practical application, after the operation order of the sub-areas and the waypoint sequence in each sub-area are exhausted, the above step S203 may include: sorting the waypoint sequences in each of sub-areas according to the operation orders of the sub-areas to obtain a set of waypoint sequences of the operation area; and planning the routes according to the waypoint sequences in the set of the waypoint sequences of the operation area to generate all the routes of the operation area.

Specifically, the above step of sorting the waypoint sequences in the sub-area according to the operation orders of the sub-areas to obtain a set of waypoint sequences of the operation area may include, but is not limited to, the following two cases.

In the first case, the UAV ground station or the UAV may pair each of the operation orders in the sub-areas with each of the waypoint sequences in the sub-areas; and sort each of the waypoint sequences according to the operation order paired with the waypoint sequence to obtain the set of waypoint sequences of the operation area.

Figure 9:
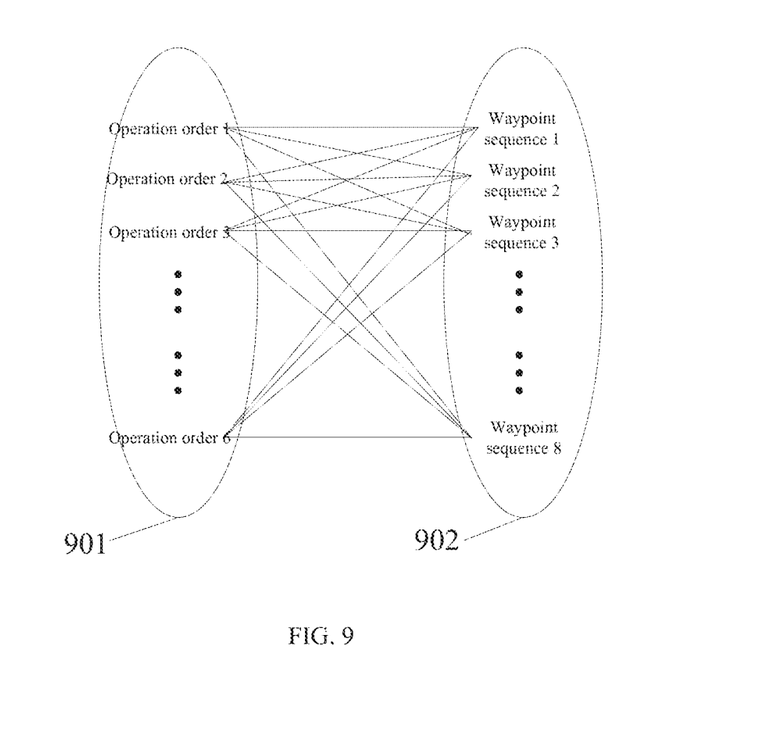
FIG. 9 is a schematic diagram showing a pairing of an operation order in a sub-area with a waypoint sequence in the sub-area, according to an embodiment of the present disclosure.

For example, still assuming that the operation area is divided into three sub-areas, each of which includes two waypoints, in step S202, 3!=6 operation orders (i.e., the set of waypoint sequences of sub-area) and $2^3$=8 waypoint sequences (i.e., the set of waypoint sequences in the sub-area) are exhausted. At this time, as shown in FIG. 9, the operation order set 901 of the sub-area and the waypoint sequence set 902 in the sub-area are paired in a complete bipartite graph. That is, the operation order of each sub-area is paired with the waypoint sequence in each sub-area. Then, the waypoint sequence is sorted according to the paired operation order. Assuming that the operation order a→c→b is paired with the waypoint sequence {AA', BB', CC'} in the area, the waypoint sequence AA'CC'BB' of the operation area can be obtained; or assuming that the operation order a→c→b is paired with the waypoint sequence {A'A, BB', CC'} in the area, the waypoint sequence A'ACC'BB' of the operation area can be obtained. By analogy, a total of 48 waypoint sequences of the operation area can be obtained and the set of waypoint sequences can be constituted by the 48 waypoint sequences of the operation area.

In the second case, on the basis of the first case, in order to simplify the waypoint sequence indicating the operation area, the UAV ground station or the UAV can also determine a starting waypoint of each of sub-areas according to the waypoint sequence in each of sub-areas; mark a status for each of sub-areas according to the starting waypoint to obtain a status identifier of each of sub-areas; sort the status identifiers of the sub-areas according to the operation orders of the sub-areas, to obtain a status identification sequence of the operation area; and associate the operation order of each of the sub-areas with the status identification sequence to constitute the set of waypoint sequences of the operation area.

Here, the UAV ground station or the UAV may determine a waypoint located at the front in the waypoint sequence of the sub-area as the starting point of the UAV in the sub-area after the obtaining of the waypoint sequence in each sub-area. Then, for each of sub-areas, when the starting waypoint in the sub-area is the first waypoint in the sub-area, the UAV ground station or the UAV may mark the status of the sub-area as a first value; and when the starting waypoint in the sub-area is the second waypoint in the sub-area, the UAV ground station or UAV may mark the status of the sub-area as a second value. Next, the status identifiers of the sub-areas are sorted in accordance with the operation order of the sub-areas to obtain the status identification sequence of the operation areas. Finally, the paired operation order of the sub-areas is associated with the corresponding status identification sequence to form the set of waypoint sequences of the operation area.

For example, if the waypoint sequence in the sub-area a is AA', the starting waypoint A can be determined. At this time, the status of the sub-area a can be marked as the first value, which for example is assigned to be 1. Otherwise, if the waypoint sequence in the sub-area a is A'A, the starting waypoint A' can be determined. At this time, the status of the sub-area a can be marked as the second value, which for example is assigned to be 0. Similarly, if the starting waypoint in sub-area b is B, at this time, the status of sub-area b can be marked as 1; otherwise, if the starting waypoint in sub-area b is B', at this time, the status of sub-area b can be marked as 0. If the starting waypoint in sub-area c is C, at this time, the status of sub-area c can be marked as 1; otherwise, if the starting waypoint in sub-area c is C', at this time, the status of sub-area c can be marked 0. Of course, the status of the corresponding sub-area can be marked as 0 when the starting waypoint is A, B or C, and the status of the corresponding sub-area is marked as 1 when the starting waypoint is A', B' or C'. The status may also be marked as other values, which are not specifically limited in the embodiments of the present disclosure.

Assuming that when the starting waypoint is A, B or C, the status of the corresponding sub-area is marked as 1 and when the starting waypoint is A', B' or C', the status of the corresponding sub-area is marked as 0, the status identifiers of the sub-areas are sorted according to 3!=6 operation orders to obtain a total of $2^3$=8 status identification sequences, namely 111, 110, 101, 100, 011, 010, 001 and 000. Next, these status identification sequences are associated with their corresponding operation orders, to obtain the combinations of (operation order of sub-area, waypoint sequence in sub-area). These combinations constitute the set of waypoint sequences of the operation area.

At this point, the planning of the UAV operation route is completed.

The above-described UAV route planning method will be described below by way of specific examples.

For example, the UAV ground station or the UAV obtains the latitude and longitude coordinates of each vertex of the operation area from the electronic map, and then fits the operation area to the concave-polygonal area 40 as shown in FIG. 4. Next, as shown in FIG. 8, an operation environment coordinate system is established with the flight starting point of the UAV as the origin, the due east direction as X-axis and the due north direction as Y-axis, and the concave-polygonal area is mapped to the operation environment coordinate system. The sides of the polygon are converted into edge vectors $N_1, N_2, N_3, \ldots, N_7$ from a certain vertex of the polygonal area as a starting point in the clockwise direction, and the outer product $N_i \times N_j$ of adjacent vectors $N_i$ and $N_j$ is calculated. The first side $N_i$ having a negative value of the outer product is extended. The concave-polygonal area is divided to obtain the sub-area a, the sub-area b, and the sub-area c. Each of the sub-areas contains two waypoints. Next, a total of 3!=6 operation orders of the sub-areas are exhausted. In the meanwhile, the status identifiers of the areas are sorted according to the operation orders to obtain a total of $2^3$=8 status identification sequences, namely 111, 110, 101, 100, 011, 010, 001 and 000. Next, the status identification sequences are associated with their corresponding operation orders to obtain 3!×$2^3$=48 combinations of {operation order of sub-area, waypoint sequence in sub-area}, such as {a→b→c, 111}, {a→b→c, 110}, {a→b→c, 101}, that is, the sequence of waypoints in the whole operation area, and then the set of waypoint sequences of the operation area is constituted. Next, the route is planned according to each of the waypoint sequences in the waypoint sequence set of the operation area, wherein the operation routes in the sub-area a, the sub-area b, and the sub-area c are planned by the principle of repeated cattle farming (boustrophedon). In this way, 48 routes in the whole operation area can be obtained. Finally, a route having the shortest voyage is selected from the 48 routes as the optimal operation route.

It should be noted that the above example is only to provide exemplary description of the implementation process of the UAV operation route planning method according to the embodiment of the present disclosure, and does not limit the UAV operation route planning method described in the embodiment of the present disclosure. A person skilled in the art can make a design according to actual demands, which is not specifically limited in the embodiment of the present disclosure.

In the UAV operation route planning method according to the embodiment of the present disclosure, after obtaining the sub-areas of the operation area of the UAV, the UAV ground station or the UAV can exhaust the operation order of the sub-areas and waypoint sequence in each sub-area, respectively. In this way, according to the operation order of the sub-areas and the waypoint sequence in the sub-area, all the routes of the operation area can be obtained. Then, the route having a total voyage meeting the preset constraint condition is selected from all the routes as the optimal operation route. At this point, the optimal operation route is the global optimal solution. If the UAV operates according to the optimal operation route, the accuracy of the UAV operation can be effectively improved. Further, since the route with the shortest total voyage is selected as the optimal operation route among all the routes, the redundant voyage during the operation of the UAV can be reduced and the energy consumption during the operation of the UAV can be reduced.

Based on the same inventive concept, an embodiment of the present disclosure provides a UAV pesticide spreading method that can be applied to the UAV described in one or more of the above embodiments. In practical applications, the UAV can be a plant protection UAV.

In this case, the above method may include: driving the UAV to perform an operation of spreading pesticides in accordance with the optimal operation route as described in one or more embodiments above. Here, the optimal operation route is obtained by the UAV ground station or the UAV using the UAV operation route planning method described above in one or more of the embodiments.

In one embodiment of the present disclosure, if the optimal operation route is obtained by planning through the UAV ground station, before the UAV performs the operation of spreading pesticides according to the optimal operation route, the method may further include: receiving the optimal operation route sent from the UAV ground station through the UAV.

In addition, it should be noted that if the UAV ground station or the UAV utilizes the operation environment coordinate system to perform sub-area division when planning the UAV operation route, then it will be necessary to map the divided sub-area or the optimal operation route to the geodetic coordinate system (i.e., the electronic map) again after the sub-areas are divided or the optimal operation route is determined. In this way, the UAV can fly according to the latitude and longitude of the optimal operation route in the electronic map.

The UAV pesticide spreading method in the embodiment of the present disclosure is one application of the UAV operation route planning method according to the above embodiment. Since the UAV performs the operation of spreading pesticides according to the optimal operation route, the accuracy of the UAV pesticide spread and the pesticide spread efficiency of the UAV can be effectively improved. Further, since the route with the shortest total voyage is selected as the optimal operation route among all the routes, the redundant voyage during the spread of the UAV can be reduced and the energy consumption during the pesticide spread of the UAV can be reduced.

Based on the same inventive concept, an embodiment of the present disclosure provides a UAV operation route planning device that can be applied to the UAV ground station or the UAV described in one or more of the above embodiments.

Figure 10:
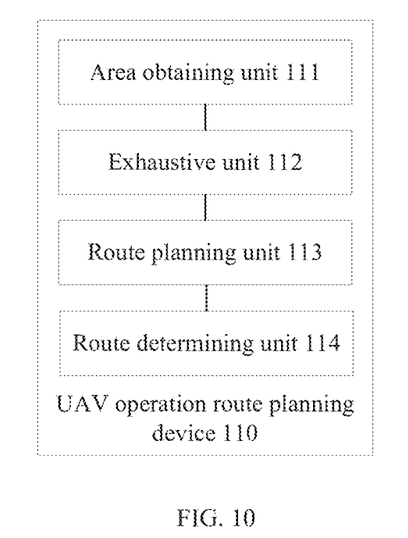
FIG. 10 is a block diagram schematically showing a UAV operation route planning device according to an embodiment of the present disclosure.

FIG. 10 is a block diagram schematically showing a UAV operation route planning device according to an embodiment of the present disclosure. Referring to FIG. 10, the UAV operation route planning device 110 may include: an area obtaining unit 111 configured to obtain a plurality of sub-areas of an operation area of the UAV; an exhaustive unit 112 configured to exhaust operation orders of the plurality of sub-areas and waypoint sequences in each of the sub-areas, respectively; a route planning unit 113 configured to plan the routes according to the operation orders of the plurality of sub-areas and the waypoint sequences in each of the sub-areas to obtain all routes in the operation area; and a route determining unit 114 configured to determine a route in all the routes having a total voyage meeting a preset constraint condition as an optimal operation route.

At this time, the optimal operation route is the global optimal solution. If the UAV operates according to the optimal operation route, the accuracy of the UAV operation can be effectively improved.

In other embodiments of the present disclosure, the area obtaining unit includes: a fitting sub-unit configured to determine the operation area according to an electronic map, extract coordinates of vertices of the operation area, and fit the operation area into a polygonal area according to the coordinates of the vertices; and a division sub-unit configured to divide the polygonal area into the plurality of sub-areas, wherein the sub-areas are a convex-polygonal area.

Further, the division sub-unit is configured to sequentially convert sides of the polygonal area into edge vectors by using an arbitrary vertex of the polygonal area as a starting point, calculate an outer product of each adjacent edge vectors, extend one of the two adjacent edge vectors having a negative value of the outer product to divide the polygonal area into the plurality of sub-areas.

In other embodiments of the present disclosure, the route planning unit includes: a sorting sub-unit configured to sort the waypoint sequences in each of sub-areas according to the operation orders of the sub-areas to obtain a set of waypoint sequences of the operation area; and a planning sub-unit configured to plan the routes according to the waypoint sequences in the set of the waypoint sequences of the operation area to generate all routes of the operation area.

In other embodiments of the present disclosure, the sorting sub-unit is specifically configured to pair each of the operation orders in the sub-areas with each of the waypoint sequences in the sub-areas; sort each of the waypoint sequences according to the operation order paired with the waypoint sequence to obtain the set of waypoint sequences of the operation area.

Alternatively, in other embodiments of the present disclosure, the sorting sub-unit may be specifically configured to determine a starting waypoint of each of sub-areas according to the waypoint sequence in each of sub-areas; mark a status for each of sub-areas according to the starting waypoint to obtain a status identifier of each of sub-areas; and sort the status identifiers of the sub-areas according to the operation orders of the plurality of sub-areas, to obtain a status identification sequence of a plurality of operation areas; and associate the operation order of each of the sub-areas with the status identification sequence to constitute the set of waypoint sequences of the operation area.

Further, the sorting sub-unit is specifically configured to, for each of sub-areas, mark the status of the sub-area as a first value in the case where the starting waypoint in the sub-area is the first waypoint; and may mark the status of the sub-area as a second value in the case where the starting waypoint in the sub-area is the second waypoint.

In other embodiments of the present disclosure, the route determination unit is configured to determine a route having the shortest total voyage of all routes as an optimal operation route. In this way, the accuracy of the operation of the UAV can be effectively improved, while the redundant voyage during the operation of the UAV can be reduced and the energy consumption during the operation of the UAV can be lowered.

It should be noted here that the description of the above device embodiments is similar to the description of the above-described process embodiments of the UAV operation route planning method, and has the same advantageous effects as the process embodiments of the UAV operation route planning method. For technical details not disclosed in the device embodiments of the present disclosure, please refer to the description of the embodiments of the UAV route planning method in the present disclosure.

Based on the same inventive concept, an embodiment of the present disclosure provides a UAV pesticide spreader that can be applied to the UAV as described in one or more of the above embodiments. The UAV can be a plant protection UAV.

Figure 11:
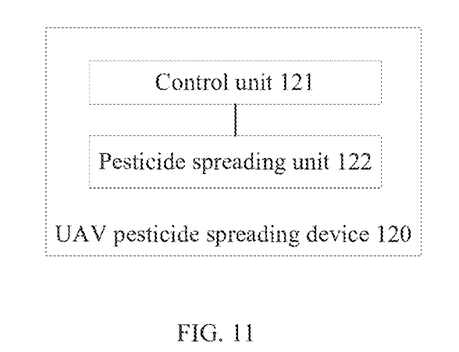
FIG. 11 is a block diagram schematically showing a UAV pesticide spreader according to an embodiment of the present disclosure.

FIG. 11 is a block diagram schematically showing a UAV pesticide spreading device according to an embodiment of the present disclosure. Referring to FIG. 11, the UAV pesticide spreader 120 may include a controller 121 configured to control the UAV to operate according to the optimal operation route determined by the UAV operation route planning method as described in one or more of the above embodiments; and a pesticide spreader 122 configured to perform pesticide spread during the operation of the UAV.

In other embodiments of the present disclosure, if the optimal operation route is obtained by planning by the UAV ground station, the UAV pesticide spreading device may further include: a receiving unit configured to receive optimal operation route sent from the UAV ground station before the UAV performs the pesticide spread operation according to the optimal operation route.

It should be noted here that the description of the above device embodiments is similar to the description of the above-described process embodiments of the UAV pesticide spreading method, and has the same advantageous effects as the process embodiments of the UAV pesticide spreading method. For technical details not disclosed in the device embodiments of the present disclosure, please refer to the description of the embodiments of the UAV pesticide spreading method in the present disclosure.

Based on the same inventive concept, an embodiment of the present disclosure further provides a computing device, which may be the UAV ground station as described above in one or more embodiments, or the UAV as described above in one or more embodiments.

Figure 12:
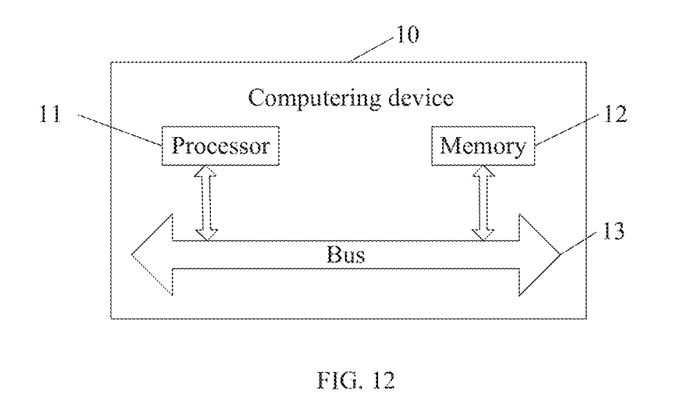
FIG. 12 is a block diagram schematically showing a computing device according to an embodiment of the present disclosure.

FIG. 12 is a block diagram schematically showing a computing device according to an embodiment of the present disclosure. Referring to FIG. 12, the computing device 10 includes: at least one processor 11; and at least one memory 12 and a bus 13 in connection with the processor 11, wherein the processor 11 and the memory 12 communicate with each other via the bus 13; the processor 11 is configured to invoke program instructions in the memory 12 to perform the steps of the UAV route planning method as described above in one or more embodiments.

It should be noted that the foregoing processor may include a central processing unit (CPU), a GPU (Graphics Processing Unit), an embedded MCU (Microcontroller Unit), and an EMPU (Embedded Microprocessor Unit), an embedded DSP (Digital Signal Processor) or an embedded SoC (System on Chip), and may further include a driver circuit, which is not specifically limited in the embodiments of the present disclosure.

It should be noted here that the description of the above device embodiments is similar to the description of the above-described process embodiments of the UAV operation route planning method, and has the same advantageous effects as the process embodiments of the UAV operation route planning method. For technical details not disclosed in the computing device according to the embodiment of the present disclosure, please refer to the description of the embodiments of the UAV route planning method in the present disclosure.

Based on the same inventive concept, an embodiment of the present disclosure further provides a UAV including: at least one processor; and at least one memory and a bus in connection with the processor, wherein the processor and the memory communicate with each other via the bus; the processor is configured to invoke program instructions in the memory to perform the steps of the UAV operation route planning method as described above in one or more embodiments, and/or to perform the steps of the UAV pesticide spreading method as described above in one or more embodiments. It should be noted that the foregoing processor may include a central processing unit (CPU), a GPU (Graphics Processing Unit), an embedded MCU (Microcontroller Unit), and an EMPU (Embedded Microprocessor Unit), an embedded DSP (Digital Signal Processor) or an embedded SoC (System on Chip), and may further include a driver circuit or the like, which is not specifically limited in the embodiments of the present disclosure.

It should be noted here that the description of the above UAV embodiment is similar to the description of the process embodiments of the UAV operation route planning method and/or the UAV pesticide spreading method, and has the similar advantageous effects to the process embodiments. For technical details not disclosed in the disclosed UAV embodiment, please refer to the description of the embodiments of the UAV operation route planning method and/or the description of the UAV pesticide spreading method in the present disclosure.

In other embodiments of the present disclosure, there is also provided a computer readable storage medium on which a computer program is stored, wherein when executed by a processor, the computer program implements the steps of UAV route planning method and/or the steps of the UAV pesticide spreading method as described above in one or more embodiments.

Those skilled in the art will appreciate that the embodiments of the present disclosure may be provided as a method, system, or computer program product. Accordingly, the present disclosure may utilize a form of a complete hardware embodiment, a complete software embodiment, or a combination of software and hardware aspects. Moreover, the present disclosure may take a form of a computer program product embodied on one or more computer-usable storage media (including but not limited to disk storage, CD-ROM, optical storage, etc.) including computer usable program codes.

The present disclosure is described with reference to flowchart diagrams and/or block diagrams of methods, apparatus (system), and computer program products according to embodiments of the present disclosure. It should be understood that each step and/or block of flowchart diagrams and/or block diagrams and a combination of steps and/or blocks of flowchart diagrams and/or block diagrams can be implemented by the computer program instructions. The computer program instructions can be provided to a processor of a general purpose computer, special-purpose computer, embedded processor, or other programmable data processing device to produce a machine, such that instructions for execution by the processor of the computer or other programmable data processing device can generate a PLM plug-in that implements the functions specified in one or more flow of the flowchart and/or one or more block of the block diagram.

The computer program instructions may also be stored in a computer readable memory that can boot the computer or other programmable data processing device to operate in a particular manner, such that the instructions stored in the computer readable memory can generate a product including the instruction PLM plug-in. The PLM plug-in can implement the functions specified in one or more flow of the flowchart and/or one or more block of the block diagram.

The computer program instructions can also be loaded onto a computer or other programmable data processing device to execute a series of operational steps on the computer or other programmable device to produce computer-implemented processing, such that the instructions executed on the computer or other programmable device can provide steps for implementing the functions specified in one or more flow of the flowchart and/or one or more block of the block diagram.

While the preferred embodiments of the present disclosure has been described, those skilled in the art can make further modifications and variations to the embodiments once the basic inventive concept is known. Therefore, the appended claims are intended to be interpreted as including the preferred embodiments and the modifications and variations falling into the scope of the present disclosure.

It is apparent that those skilled in the art can make various modifications and variations to the present disclosure without departing from the spirit and scope of the present disclosure. Thus, the present disclosure is intended to encompass the modifications and the modifications if such modifications and variations of the present disclosure are within the scope of the appended claims and their equivalents.

The invention claimed is:

1. A UAV operation route planning method, comprising steps of:
   obtaining a plurality of sub-areas of an operation area of a UAV;
   exhausting operation orders of the sub-areas and waypoint sequences in each of the sub-areas, respectively, wherein the waypoint sequences in each of the sub-areas includes a sequence obtained by sorting waypoints in each of the sub-areas, and the waypoints in each of the sub-areas includes a starting point, an ending waypoint or a combination of the starting waypoint and the ending waypoint;
   planning routes according to the operation orders of the sub-areas and the waypoint sequences in each of the sub-areas to obtain all routes in the operation area; and
   determining a route in all the routes having a total voyage meeting a preset constraint condition as an optimal operation route,
   wherein the step of planning routes according to the operation orders of the sub-areas and the waypoint sequences in the sub-areas to obtain all routes in the operation area, comprises:
   sorting the waypoint sequences in each of the sub-areas according to the operation orders of the sub-areas to obtain a set of waypoint sequences of the operation area; and
   planning the routes according to the waypoint sequences in the set of the waypoint sequences of the operation area to generate all the routes of the operation area.

2. The method according to claim 1, wherein the step of sorting the waypoint sequences in each of the sub-areas according to the operation orders of the sub-areas to obtain a set of waypoint sequences of the operation area, comprises:
   pairing each of the operation orders in the sub-areas with each of the waypoint sequences in the sub-areas; and
   sorting each of the waypoint sequences according to the operation order paired with the waypoint sequence to obtain the set of waypoint sequences of the operation area.

3. The method according to claim 1, wherein the step of sorting the waypoint sequences in each of the sub-areas according to the operation orders of the sub-areas to obtain a set of waypoint sequences of the operation area, comprises:
   determining a starting waypoint of each of the sub-areas according to the waypoint sequence in each of the sub-areas;
   marking a status for each of the sub-areas according to the starting waypoint to obtain a status identifier of each of the sub-areas;
   sorting the status identifiers of the sub-areas according to the operation orders of the sub-areas, to obtain a status identification sequence of the operation area; and
   associating the operation order of each of the sub-areas with the status identification sequence to constitute the set of waypoint sequences of the operation area.

4. The method according to claim 3, wherein the step of marking a status for each of the sub-areas according to the starting waypoint comprises:
   for each of the sub-areas, in the case where the starting waypoint in the sub-area is the first waypoint in the sub-area, marking the status of the sub-area as a first value; and in the case where the starting waypoint in the sub-area is the second waypoint in the sub-area, marking the status of the sub-area as a second value.

5. The method of claim 1 wherein the step of obtaining a plurality of sub-areas of an operation area of the UAV comprises:
   determining the operation area according to an electronic map, and extracting coordinates of vertices of the operation area;
   fitting the operation area to a polygonal area according to the coordinates of the vertices; and
   dividing the polygonal area into the plurality of sub-areas, wherein the sub-areas are a convex-polygonal area.

6. The method according to claim 5, wherein the step of dividing the polygonal area into the plurality of sub-areas comprises:
   converting sequentially sides of the polygonal area into edge vectors by using an arbitrary vertex of the polygonal area as a starting point;

calculating an outer product of each adjacent edge vectors; and extending one of the two adjacent edge vectors having a negative value of the outer product to divide the polygonal area into the plurality of sub-areas.

7. The method according to claim 1, wherein the step of determining a route in all the routes having a total voyage meeting a preset constraint condition as an optimal operation route comprises:

determining a route in all the routes having the shortest voyage as the optimal operation route.

8. A UAV pesticide spreading method, comprising:

driving a UAV to perform an operation of spreading pesticides in accordance with the optimal operation route according to claim 1.

9. The method according to claim 8, further comprising:

receiving the optimal operation route sent from a ground station by the UAV.

10. A UAV operation route planning device, comprising:

an area obtaining unit configured to obtain a plurality of sub-areas of an operation area of a UAV;

an exhaustive unit configured to exhaust operation orders of the sub-areas and waypoint sequences in each of the sub-areas, respectively, wherein the waypoint sequences in each of the sub-areas includes a sequence obtained by sorting waypoints in each of the sub-areas, and the waypoints in each of the sub-areas includes a starting point, an ending waypoint or a combination of the starting waypoint and the ending waypoint;

a route planning unit configured to plan the routes according to the operation orders of the sub-areas and the waypoint sequences in each of the sub-areas to obtain all routes in the operation area; and a route determining unit configured to determine a route in all the routes having a total voyage meeting a preset constraint condition as an optimal operation route, wherein the route planning unit comprises:

a sorting sub-unit configured to sort the waypoint sequences in each of the sub-areas according to the operation orders of the sub-areas to obtain a set of waypoint sequences of the operation area; and a planning sub-unit configured to plan the routes according to the waypoint sequences in the set of the waypoint sequences of the operation area to generate all routes of the operation area.

11. A UAV pesticide spreading device comprising:

a controller configured to control a UAV to operate in accordance with the optimal operation route according to claim 1; and a pesticide spreader configured to perform an operation of spreading pesticide during flight of the UAV.

12. A computing device, comprising:

at least one processor; and at least one memory and a bus in connection with the processor, wherein the processor and the memory communicate with each other via the bus; and the processor is configured to invoke program instructions in the memory to perform the steps of the UAV route planning method according to claim 1.

13. A UAV, comprising:

at least one processor; and at least one memory in connection with the processor, wherein the processor is configured to invoke program instructions in the memory to perform the steps of the UAV operation route planning method according to claim 1.

14. A UAV, comprising:

at least one processor; and at least one memory in connection with the processor, wherein the processor is configured to invoke program instructions in the memory to perform the steps of the UAV pesticide spreading method according to claim 8.

* * * * *